US011265950B2

(12) United States Patent
Tang

(10) Patent No.: US 11,265,950 B2
(45) Date of Patent: Mar. 1, 2022

(54) COMMUNICATION METHOD, NETWORK DEVICE, AND TERMINAL DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/882,073

(22) Filed: May 22, 2020

(65) Prior Publication Data

US 2020/0288529 A1    Sep. 10, 2020

Related U.S. Application Data

(63) Continuation of application No. PCT/CN2018/076850, filed on Feb. 14, 2018.

(51) Int. Cl.
*H04W 76/19* (2018.01)
*H04W 76/27* (2018.01)

(52) U.S. Cl.
CPC .......... *H04W 76/19* (2018.02); *H04W 76/27* (2018.02)

(58) Field of Classification Search
CPC ... H04W 36/305; H04W 36/32; H04W 36/03; H04W 36/16; H04W 36/24; H04W 68/02; H04W 8/12; H04W 92/20; H04W 48/20; H04W 4/70; H04W 72/048; H04W 72/0413; H04W 76/19; H04W 76/27
See application file for complete search history.

(56) References Cited

U.S. PATENT DOCUMENTS

| 2013/0039339 | A1* | 2/2013 | Rayavarapu | .......... | H04W 76/19 |
| | | | | | 370/331 |
| 2015/0358483 | A1* | 12/2015 | Jeong | .......... | H04L 47/20 |
| | | | | | 370/328 |

(Continued)

FOREIGN PATENT DOCUMENTS

| CN | 101998664 A | 3/2011 |
| CN | 107124741 A | 9/2017 |

(Continued)

OTHER PUBLICATIONS

International Search Report and Written Opinion, PCT/CN2018/076850, dated Nov. 14, 2018, 8 pgs.

(Continued)

*Primary Examiner* — Jean A Gelin
(74) *Attorney, Agent, or Firm* — Morgan, Lewis & Bockius LLP

(57) ABSTRACT

Disclosed in the embodiments of the present application are a communication method, a network device, and a terminal device, the method comprising: a first network node receives a radio resource control (RRC) connection recovery request sent by a terminal device in a non-activated state, the RRC connection recovery request comprising indication information, and the indication information being used for indicating whether to change the anchor network node of the terminal device; the first network node is the network node currently serving the terminal device, and a second network node is the anchor network node of the terminal device.

12 Claims, 8 Drawing Sheets

100

(56) References Cited

U.S. PATENT DOCUMENTS

| | | | |
|---|---|---|---|
| 2015/0365994 | A1 | 12/2015 | Yu et al. |
| 2017/0201922 | A1* | 7/2017 | Akiyoshi ............... H04W 4/70 |
| 2017/0339612 | A1* | 11/2017 | Quan ............. H04W 36/00837 |
| 2018/0092157 | A1* | 3/2018 | Chen ................... H04W 52/028 |
| 2018/0176834 | A1* | 6/2018 | Wei ................... H04W 36/0016 |
| 2018/0302942 | A1* | 10/2018 | Wu ....................... H04W 24/10 |
| 2019/0007874 | A1* | 1/2019 | Mildh .................. H04W 48/12 |
| 2019/0116483 | A1* | 4/2019 | Ryu ..................... H04W 76/12 |
| 2019/0166576 | A1* | 5/2019 | Kim ..................... H04W 36/08 |
| 2019/0174421 | A1* | 6/2019 | Quan ................. H04W 52/0274 |
| 2019/0208497 | A1* | 7/2019 | Li ......................... H04W 68/02 |
| 2019/0246370 | A1* | 8/2019 | Xu ........................ H04W 88/10 |
| 2019/0357295 | A1* | 11/2019 | Kim ..................... H04L 5/0053 |
| 2019/0357299 | A1* | 11/2019 | Li ......................... H04W 72/04 |
| 2020/0128608 | A1* | 4/2020 | Yang .................... H04W 76/25 |
| 2020/0236720 | A1* | 7/2020 | Hong ................... H04L 5/0053 |
| 2020/0305117 | A1* | 9/2020 | Tang .................... H04W 76/10 |
| 2020/0329394 | A1* | 10/2020 | Kimba Dit Adamou .................... H04W 24/08 |

FOREIGN PATENT DOCUMENTS

| | | | | |
|---|---|---|---|---|
| WO | WO2017/162380 | A1 | 9/2017 | |
| WO | WO-2017162380 | A1 * | 9/2017 | ............. H04W 4/70 |
| WO | WO2017/194104 | A1 | 11/2017 | |
| WO | WO-2017194104 | A1 * | 11/2017 | ............. H04W 8/12 |

OTHER PUBLICATIONS

Guagdong OPPO Mobile Telecommunications Corp., Ltd., Communication Pursuant to Article 94(3), EP18906018.9, dated Mar. 24, 2021, 8 pgs.

Guangdong OPPO Mobile Telecommunications Corp. Ltd., Extended European Search Report, EP18906018.9, dated Nov. 9, 2020, 11 pgs.

ETSI MCC, Report of 3GPP TSG RAN2#98 meeting, Hangzhou, China, 3GPP TSG-RAN WG2 meeting #99, R2-1707601, Berlin, Germany, Aug. 21-25, 2017, 294 pgs.

Nokia, Alcatel-Lucent Shanghai Bell, RRC Inactive procedures, 3GPP TSG-RAN WG2 Meeting NR Ad Hoc, R2-1700104, Spokane, USA, Jan. 17-19, 2017, 4 pgs.

ZTE, Sanechips, Consideration on periodic RAN area update procedure, 3GPP TSG-RAN WG2 Meeting #100, R2-172615, Reno, USA, Nov. 27-Dec. 1, 2017, 5 pgs.

Guagdong OPPO Mobile Telecommunications Corp., Ltd., Communication Pursuant to Article 94(3), EP18906018.9, dated Jul. 1, 2021, 8 pgs.

Guagdong OPPO Mobile Telecommunications Corp., Ltd., First Office Action, CN202010263554.6, dated Jun. 23, 2021, 14 pgs.

Guagdong OPPO Mobile Telecommunications Corp., Ltd., Examination Report, IN202027028054, dated Jun. 25, 2021, 6 pgs.

Guagdong Oppo Mobile Telecommunications Corp., Ltd., Second Office Action, CN202010263554.6, dated Sep. 1, 2021, 12 pgs.

Guagdong Oppo Mobile Telecommunications Corp., Ltd., Communication Pursuant to Article 94(3), EP18906018.9, dated Nov. 26, 2021, 9 pgs.

Guagdong Oppo Mobile Telecommunications Corp., Ltd., Notice of Reasons for Refusal, JP2020536885, dated Dec. 8, 2021, 12 pgs.

Guagdong Oppo Mobile Telecommunications Corp., Ltd., Notification of Reason for Refusal, KR1020207019668, dated Dec. 21, 2021, 19 pgs.

Huawei, Security for Msg4, RAN WG2 Meeting #AH-18.01, R2-1800508, Vancouver, Canada, Jan. 22-26, 2018, 7 pgs.

LG Electronics Inc., Anchor relocation in RRC Inactive, 3GPP TSG-RAN WG2 NR AH, R2-1801353, Vancouver, Canada, Jan. 22-Jan. 26, 2018, 2 pgs.

Nokia, Nokia Shanghai Bell, Way forward on periodic RNA Update, Gpp TSG-RAN WG3#98, R3-174892, Reno, NV, USA, Nov. 27-Dec. 1, 2017, 1 pg.

* cited by examiner

COMMUNICATION METHOD, NETWORK DEVICE, AND TERMINAL DEVICE

CROSS-REFERENCE TO RELATED APPLICATIONS

This application is a continuation application of PCT Patent Application No. PCT/CN2018/076850, entitled "COMMUNICATION METHOD, NETWORK DEVICE, AND TERMINAL DEVICE" filed on Feb. 14, 2018, which is incorporated by reference in its entirety.

TECHNICAL FIELD

The embodiments of the present application relate to the field of communications, and more specifically, to a communication method, a network device, and a terminal device.

BACKGROUND

In the existing communication system, in order to reduce the need for air interface signaling and quickly recover the wireless connection, a new Radio Resource Control (RRC) state, that is, an inactive state (RRC_INACTIVE), is introduced in the terminal device. In the RRC_INACTIVE state, the network can be configured with a paging area for radio access network (RAN) paging. When a terminal device moves within the paging area, it is not necessary to notify the network side. when the terminal device moves out of the paging area, if the downstream data of the terminal device arrives, the network node that is used to maintain the terminal device connected to the RAN and the Core Network (CN), that is, the network node currently serving the terminal device, will trigger sending a paging message to the terminal device in all cells in the paging area, so that the terminal device in the RRC_INACTIVE state resumes the RRC connection and performs data reception.

The terminal device may enter the RRC connection state from the RRC_INACTIVE state, based on the following trigger conditions:

1. the downlink data of the terminal device arrives;
2. the terminal device initiates the RAN location area update;
3. the terminal device has the needs for sending uplink data.

However, no matter what kind of trigger condition, context information of the terminal device needs to be obtained, and the context information of the terminal device is stored on the anchor network node of the terminal device. In this case, how to recover the RRC connection to reduce signaling overhead of the network is an urgent problem.

SUMMARY

Embodiments of the present application provide a communication method, a network device, and a terminal device, which can reduce signaling overhead of network.

In a first aspect, a communication method is provided, including:

receiving, by a first network node, a radio resource control RRC connection recovery request sent by a terminal device in a non-activated state, the RRC connection recovery request including indication information, and the indication information being used for indicating whether to change an anchor network node of the terminal device; wherein, the first network node is a network node currently serving the terminal device, a second network node is an anchor network node of the terminal device, context information of the terminal device is not stored on the first network node, and the context information of the terminal device is stored on the second network node; determining, by the first network node, whether to change the anchor network node of the terminal device according to the indication information.

Optionally, the terminal device may determine whether to change the anchor network node of the terminal device according to a trigger event for recovering RRC connection. For example, if the trigger event is an RAN location area update initiated by the terminal device itself, in this case, the terminal device can determine that it is not necessary to change the anchor network node, which can reduce signaling overhead of a network, or if the trigger event is arrival of downlink data, or uplink data is to be transmitted, in this case, the terminal device can determine to change the anchor network node to enable timely data transmission.

In a possible implementation manner, the determining, by the first network node, whether to change the anchor network node of the terminal device according to the indication information, includes: if the indication information indicates that the anchor network node of the terminal device is to be changed, determining, by the first network node, to change the anchor network node of the terminal device; or, if the indication information indicates that the anchor network node of the terminal device is not to be changed, determining, by the first network node, not to change the anchor network node of the terminal device.

In a possible implementation manner, the method further includes: obtaining, by the first network node, the context information of the terminal device from the second network node, in a case where it is determined that the anchor network node of the terminal device is to be changed; recovering, by the first network node, the RRC connection of the terminal device, according to the context information of the terminal device.

In a possible implementation manner, the obtaining, by the first network node, the context information of the terminal device from the second network node, includes: sending, by the first network node, a context request message to the second network node, the context request message being used to request to obtain the context information of the terminal device; receiving, by the first network node, the context information of the terminal device returned by the second network node.

In a possible implementation manner, the method further includes: forwarding, by the first network node, the RRC connection recovery request to the second network node, in a case where it is determined that the anchor network node of the terminal device is not to be changed; recovering, by the first network node, the RRC connection of the terminal device, according to a response message returned by the second network node.

In a second aspect, a communication method is provided, including: receiving, by a first network node, a radio resource control RRC connection recovery request sent by a terminal device in a non-activated state, wherein the first network node is a network node currently serving the terminal device, a second network node is an anchor network node of the terminal device, context information of the terminal device is not stored on the first network node, and the context information of the terminal device is stored on the second network node; forwarding, by the first network node, the RRC connection recovery request to the second network node; recovering, by the first network node, the RRC connection of the terminal device, according to a response message of the second network node.

In a possible implementation manner, the recovering, by the first network node, the RRC connection of the terminal device, according to the response message of the second network node, includes: forwarding, by the first network node, the response message to the terminal device, if the response message is an RRC connection recovery response message.

In a possible implementation manner, the recovering, by the first network node, the RRC connection of the terminal device, according to the response message of the second network node, includes: recovering, by the first network node, the RRC connection of the terminal device, according to the context information of the terminal device, if the response message is the context information of the terminal device.

In a third aspect, a communication method is provided, including:

determining, by a terminal device in a non-activated state, whether to change an anchor network node of the terminal device;

sending, by the terminal device, a radio resource control RRC connection recovery request to a first network node, the RRC connection recovery request including indication information, and the indication information being used to indicate whether to change an anchor network node of the terminal device, wherein the first network node is a network node currently serving the terminal device, and context information of the terminal device is not stored on the first network node.

In a possible implementation manner, the method further includes: in a case where the anchor network node of the terminal device is not to be changed, receiving, by the terminal device, an RRC connection recovery response message sent by a second network node and forwarded by the first network node, the second network node is the anchor network node of the terminal device, and the context information of the terminal device is stored on the second network node.

In a possible implementation manner, the method further includes: receiving, by the terminal device, the RRC connection recovery response message sent by the first network node, in a case where the anchor network node of the terminal device is to be changed.

In a possible implementation manner, the determining, by the terminal device in the non-activated state, whether to change the anchor network node of the terminal device, includes: determining, by the terminal device, not to change the anchor network node of the terminal device, if a trigger event of the terminal device switching from a non-activated state to a connection state is RAN location area update of access network.

In a fourth aspect, a communication method is provided, including: receiving, by a second network node, a radio resource control RRC connection recovery request sent by a terminal device in a non-activated state and forwarded by a first network node, wherein the first network node is a network node currently serving the terminal device, the second network node is an anchor network node of the terminal device, context information of the terminal device is not stored on the first network node, and the context information of the terminal device is stored on the second network node; determining, by the second network node, whether to change the anchor network node of the terminal device.

In a possible implementation manner, the method further includes: returning, by the second network node, the RRC connection recovery response message to the first network node, when determining not to change the anchor network node of the terminal device, so that the first network node forwards the RRC connection recovery response message to the terminal device.

In a possible implementation manner, the method further includes: returning, by the second network node, the context information of the terminal device to the first network node, when determining to change the anchor network node of the terminal device.

In a fifth aspect, a network device is provided for performing the foregoing first aspect or the method in any possible implementation manner of the first aspect. Specifically, the device includes a unit for performing the foregoing first aspect or the method in any possible implementation manner of the first aspect.

In a sixth aspect, a network device is provided for performing the foregoing second aspect or the method in any possible implementation manner of the second aspect. Specifically, the device includes a unit for performing the foregoing second aspect or the method in any possible implementation manner of the second aspect.

In a seventh aspect, a network device is provided for performing the foregoing third aspect or the method in any possible implementation manner of the third aspect. Specifically, the device includes a unit for performing the foregoing third aspect or the method in any possible implementation manner of the third aspect.

In an eighth aspect, a network device is provided, for performing the foregoing fourth aspect or the method in any possible implementation manner of the fourth aspect. Specifically, the device includes a unit for performing the foregoing fourth aspect or the method in any possible implementation manner of the fourth aspect.

In a ninth aspect, a network device is provided, the network device including: a memory, a processor, an input interface, and an output interface. Wherein, the memory, the processor, the input interface and the output interface are connected through a bus system. The memory is used to store instructions, and the processor is configured to execute the instructions stored in the memory, and used to execute the method in the foregoing first aspect or any possible implementation manner of the first aspect, or the method in the foregoing second aspect or any possible implementation manner of the second aspect, and used to execute the method in the foregoing fourth aspect or any possible implementation manner of the fourth aspect In a tenth aspect, a terminal device is provided, the terminal device including: a memory, a processor, an input interface, and an output interface, wherein the memory, the processor, the input interface and the output interface are connected through a bus system. The memory is used to store instructions, and the processor is used to execute the instructions stored in the memory, and used to execute the method in the foregoing third aspect or in any possible implementation manner of the third aspect.

In an eleventh aspect, a computer storage medium is provided for storing, the method in the foregoing first aspect or any possible implementation manner of the first aspect, or the method in the foregoing second aspect or any possible implementation of the second aspect, or the method in the third aspect or any possible implementation manner of the third aspect, or the computer software instructions used by the method in the fourth aspect or any possible implementation manner of the fourth aspect, which includes programs designed for executing the above aspects.

In a twelfth aspect, a computer program product is provided, including instructions, which when executed on a computer, causes the computer to execute, the method of the first aspect or any optional implementation manner of the first aspect, or the method in the second aspect or any possible implementation of the second aspect, or the method in the third aspect or any possible implementation of the third aspect, or the method in the fourth aspect or any possible implementation of the fourth aspect.

DETAILED DESCRIPTION

The technical solutions in the embodiments of the present application can be applied to various communication systems, for example, a Global System of Mobile (GSM) communication system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a future 5G system, etc.

Figure 1:
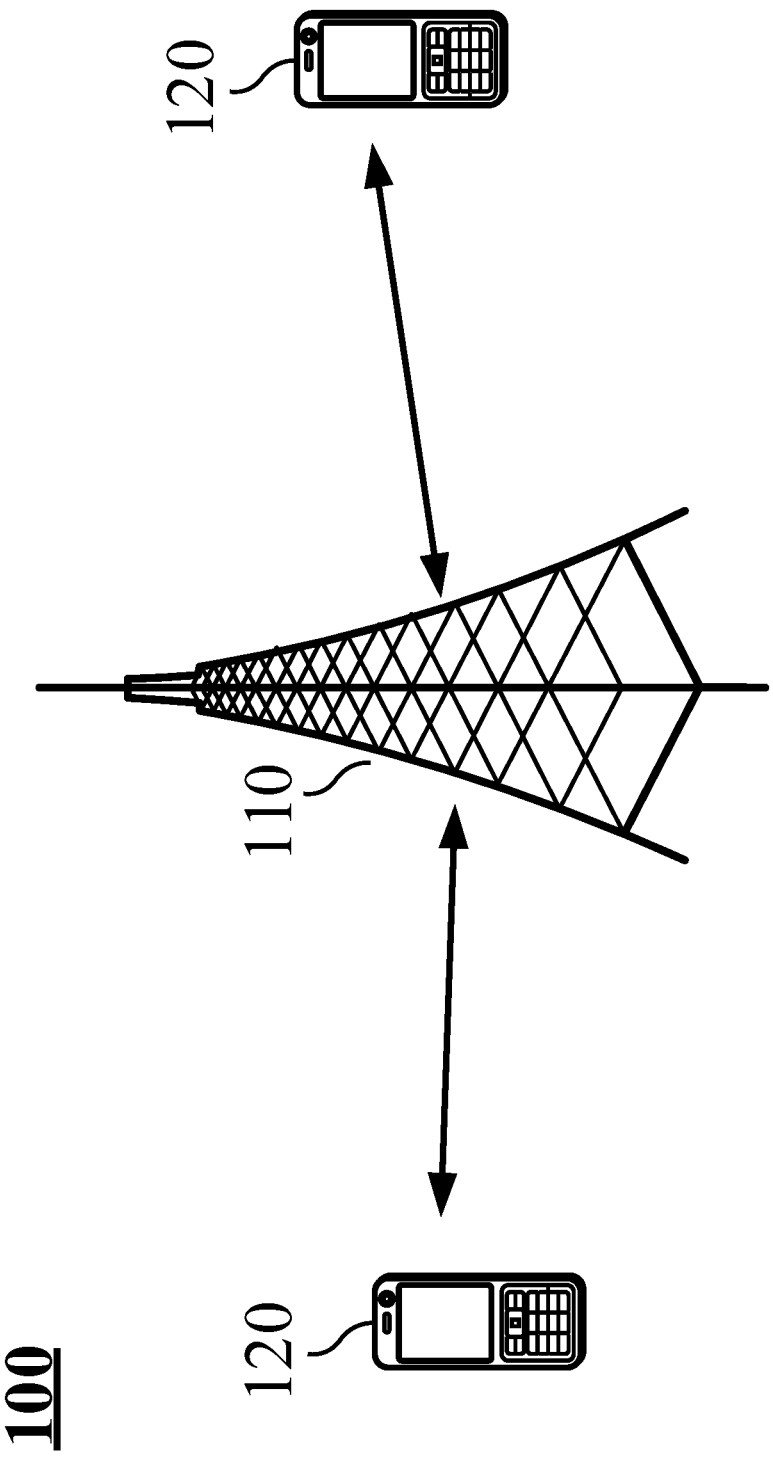
FIG. 1 is a schematic diagram of a communication system according to an embodiment of the present application.

FIG. 1 shows a wireless communication system 100 applied in an embodiment of the present application. The wireless communication system 100 may include a network device 110. The network device 110 may be a device that communicates with a terminal device. The network device 110 may provide communication coverage for a specific geographic area, and may communicate with terminal devices (for example, UE) located within the coverage area. Optionally, the network device 110 may be a base station (Base Transceiver Station, BTS) in a GSM system or a CDMA system, or a base station (NodeB, NB) in a WCDMA system, or an evolved base station in an LTE system (Evolutional Node B, eNB or eNodeB), or a wireless controller in a Cloud Radio Access Network (CRAN), or the network device may be a relay station, an access point, a vehicle-mounted device, a wearable device, a network-side device in a future 5G network or a network device in a future evolved Public Land Mobile Network (PLMN).

The wireless communication system 100 further includes at least one terminal device 120 located within the coverage area of the network device 110. The terminal device 120 may be mobile or fixed. Optionally, the terminal device 120 may refer to an access terminal, a user equipment (User Equipment, UE), a user unit, a user station, a mobile station, a mobile station, a remote station, a remote terminal, a mobile device, a user terminal, a terminal, a wireless communication device, a user agent, or a user device. The access terminal can be a cell phone, a cordless phone, a Session Initiation Protocol (SIP) phone, a Wireless Local Loop (WLL) station, a Personal Digital Assistant (PDA), a handheld device with wireless communication function, a computing device, or other processing devices connected to a wireless modem, in-vehicle devices, a wearable device, a terminal device in future 5G networks, or a terminal device in future evolved PLMNs.

Figure 2:
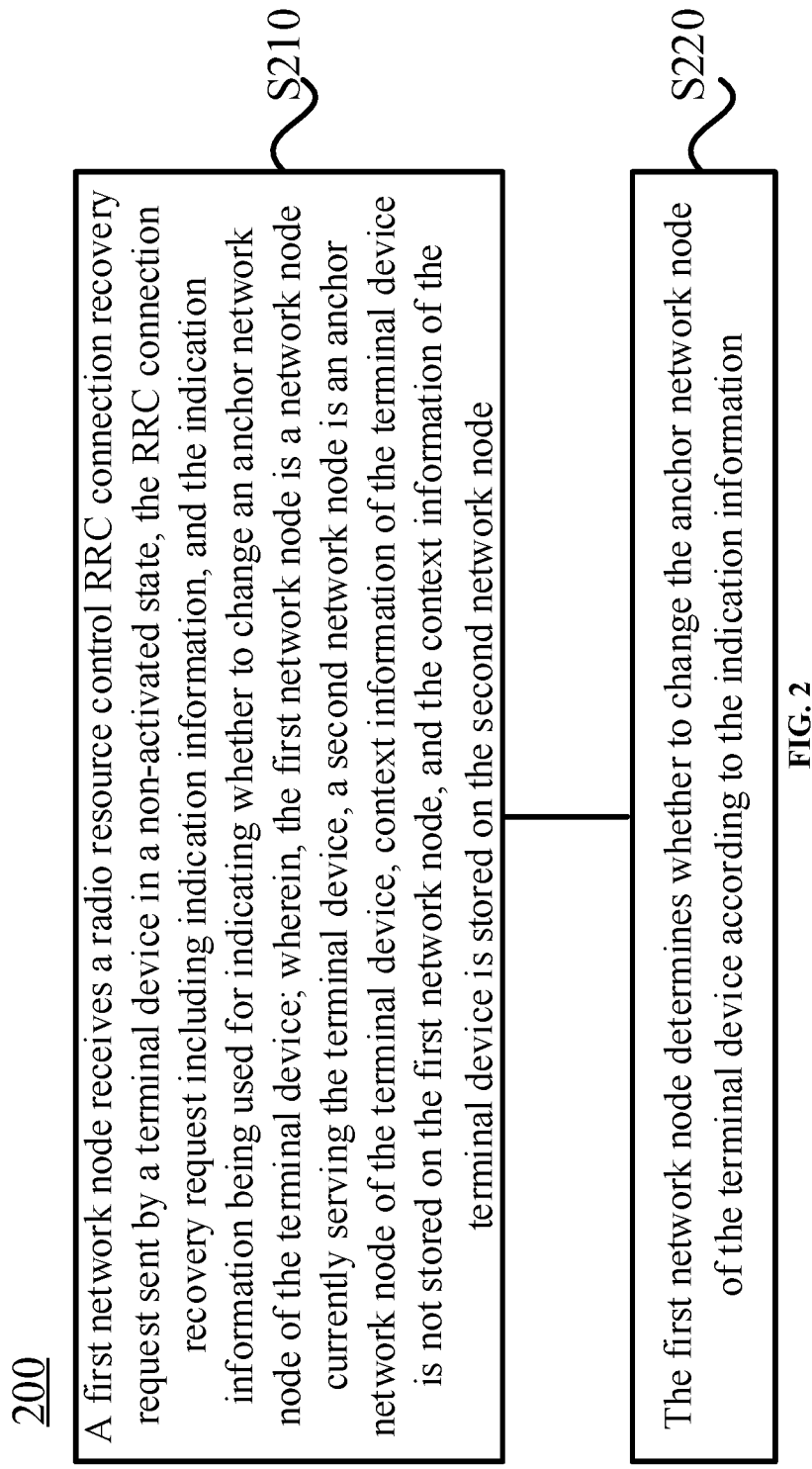
FIG. 2 is a schematic flowchart of a communication method according to an embodiment of the present application.

FIG. 2 is a schematic flowchart of a communication method 200 according to an embodiment of the present application. The method 200 may be executed by the network device in the communication system 100 shown in FIG. 1. As shown in FIG. 2, the method 200 may include the following contents:

in S210, a first network node receives a radio resource control RRC connection recovery request sent by a terminal device in a non-activated state, the RRC connection recovery request including indication information, and the indication information being used for indicating whether to change an anchor network node of the terminal device;

wherein, the first network node is a network node currently serving the terminal device, a second network node is the anchor network node of the terminal device, context information of the terminal device is not stored on the first network node, and the context information of the terminal device is stored on the second network node;

in S220, the first network node determines whether to change the anchor network node of the terminal device according to the indication information.

It should be understood that the first network node is the network node currently serving the terminal device, the context information of the terminal device is not stored on the first network node, and the context information of the terminal device is stored in the anchor network node of the terminal device, wherein the anchor network node of the terminal device is a network device that was last connected to before the terminal device enters the non-activated state. Therefore, the context information of the terminal device is stored the anchor network node of the terminal device.

In the embodiment of the present application, the terminal device may switch from the non-activated state to an RRC connection state when the trigger event described above occurs. Specifically, the terminal device may send the RRC connection recovery request to the first network node currently serving the terminal device for requesting to recover the RRC connection of the terminal device.

Optionally, in the embodiment of the present application, the RRC connection recovery request may include indication information for indicating whether to change the anchor network node of the terminal device. Optionally, the terminal device may determine whether to change the anchor network node of the terminal device according to the trigger event for recovering the RRC connection.

For example, if the trigger event is RAN location area update initiated by the terminal device itself, in this case, the terminal device may determine not to change the anchor network node, thereby reducing network signaling overhead, or if the trigger event is arrival of downlink data, or there is uplink data to be transmitted, in this case, the terminal device can determine to change the anchor network node of the terminal device, so that the data can be transmitted in a timely manner.

It should be noted that an RAN paging area can be pre-configured in each of the network devices by an operator, or can be determined by the anchor network node according to the characteristics of the displacement of the terminal device. This authorization does not specifically limit the determination of the RAN paging area.

Optionally, in the embodiment of the present application, the RAN location area update may be a periodic RAN location area update, that is, the RAN paging area of the terminal device is periodically updated, or it may also be a cross-area location update, that is the cross-area location update is triggered due to moving to an area outside the RAN paging area, etc.

In the embodiment of the present application, after receiving the RRC connection recovery request sent by the terminal device, the first network node may determine whether to change the anchor network node of the terminal device according to the indication information included in the RRC connection recovery request. For example, if the indication information indicates that the anchor network node of the terminal device is to be changed, the first network node determines to change the anchor network node of the terminal device; or if the indication information indicates that the anchor network node of the terminal device is not to be changed, the first network node determines not to change the anchor network node of the terminal device.

Optionally, in some embodiments, the method 200 further includes:

obtaining, by the first network node, the context information of the terminal device from the second network node, when determining to change the anchor network node of the terminal device;

recovering, by the first network node, the RRC connection of the terminal device, according to the context information of the terminal device.

Specifically, if it is determined that the anchor network node of the terminal device is to be changed, the first network node may send a context request message to the second network node for requesting to obtain the context information of the terminal device. Optionally, the context request message may carry identification information of the terminal device, and after receiving the context request message, the second network node may return the context information of the terminal device to the first network node; further, the first network node may recover the RRC connection of the terminal device according to the context information of the terminal device.

Optionally, the second network node may refuse to change the anchor network node of the terminal device. In this case, the second network node may refuse to return the context information of the terminal device to the first network node. For example, the second network node may return a refused message to the first network node for indicating that the anchor network node of the terminal device is not to be changed, or the second network node may not return anything to the first network node.

In a case where the first network node receives the refused message or does not receive a response message returned by the second network node, the first network node may determine not to change the anchor network node of the terminal device. Further, the first network node may forward the RRC connection recovery request sent by the terminal device to the second network node. Specifically, the first network node may send the RRC connection recovery response message to the second network node in a container manner. Then, the first network node may receive the RRC connection recovery response message returned by the second network node. Further, the first network node may forward the RRC connection recovery response message sent by the second network node to the terminal device. Specifically, the first network node may send the RRC connection recovery response message to the terminal device in a container manner, and is used to recover the RRC connection of the terminal device.

Optionally, in some embodiments, the method 200 further includes:

if it is determined that the anchor network node of the terminal device is not to be changed, the first network node forwards the RRC connection recovery request to the second network node;

the first network node recovers the RRC connection of the terminal device according to the response message returned by the second network node.

The specific implementation process can refer to the related foregoing descriptions, and will not be repeated here.

Figure 3:
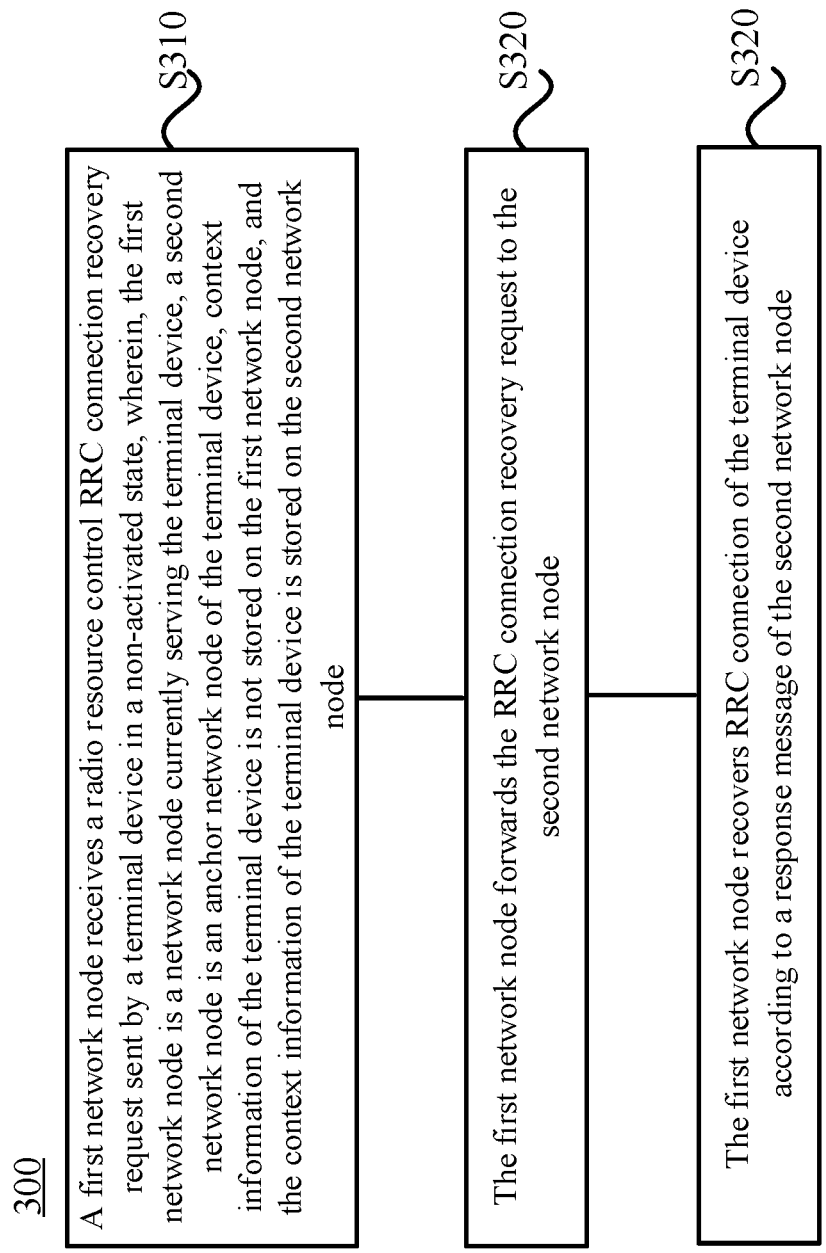
FIG. 3 is a schematic flowchart of a communication method according to another embodiment of the present application.

FIG. 3 is a schematic flowchart of a communication method 300 according to an embodiment of the present application. The method 300 may be executed by the network device in the communication system 100 shown in FIG. 1. As shown in FIG. 3, the method 300 may include the following content:

in S310, a first network node receives a radio resource control RRC connection recovery request sent by a terminal device in a non-activated state, wherein the first network node is a network node currently serving the terminal device, a second network node is an anchor network node of the terminal device, context information of the terminal device is not stored on the first network node, and the context information of the terminal device is stored on the second network node;

in S320, the first network node forwards the RRC connection recovery request to the second network node;

in S330, the first network node recovers RRC connection of the terminal device according to a response message of the second network node.

In this embodiment, after receiving the RRC connection recovery request sent by the first network node, the second network node may determine whether to change the anchor network node of the terminal device, that is, in this embodiment, whether to change the anchor network node of the terminal device is determined by the second network node.

Optionally, the second network node may determine whether to change the anchor network node of the terminal device according to its own load. For example, the second network node may determine to change the terminal device when the load on the terminal device is large, and determine not to change the anchor network node of the terminal device when the load of the anchor network node is light, so that load balancing of the network device can be achieved Optionally, the second network node may determine whether to change the anchor network node of the terminal device according to a trigger event of the terminal device recovering the RRC connection. For specific implementation, refer to the foregoing related description, and details are not described herein again.

Optionally, if the second network node determines to change the anchor network node of the terminal device, the second network node may return context information of the terminal device to the first network node, so that the first network node may recover the RRC connection of the terminal device according to the context information of the terminal device.

Optionally, if the second network node determines not to change the anchor network node of the terminal device, the second network node may return an RRC connection recovery response message to the first network node, so that the first network node may forward the RRC connection recovery response message to the terminal device. Specifically, the first network node may send the RRC connection recovery response message to the terminal device in a container manner for recovering the RRC connection of the terminal device.

The communication method according to the embodiment of the present application has been described above with reference to FIGS. 2 to 3 from perspective of a current network node. The communication method according to the embodiment of the present application is described below with reference to FIG. 4 from the perspective of a terminal device. It should be understood that the description of the network node and the description of the terminal device correspond to each other. Similar descriptions can be referred to above. To avoid repetition, details are not repeated here.

Figure 4:
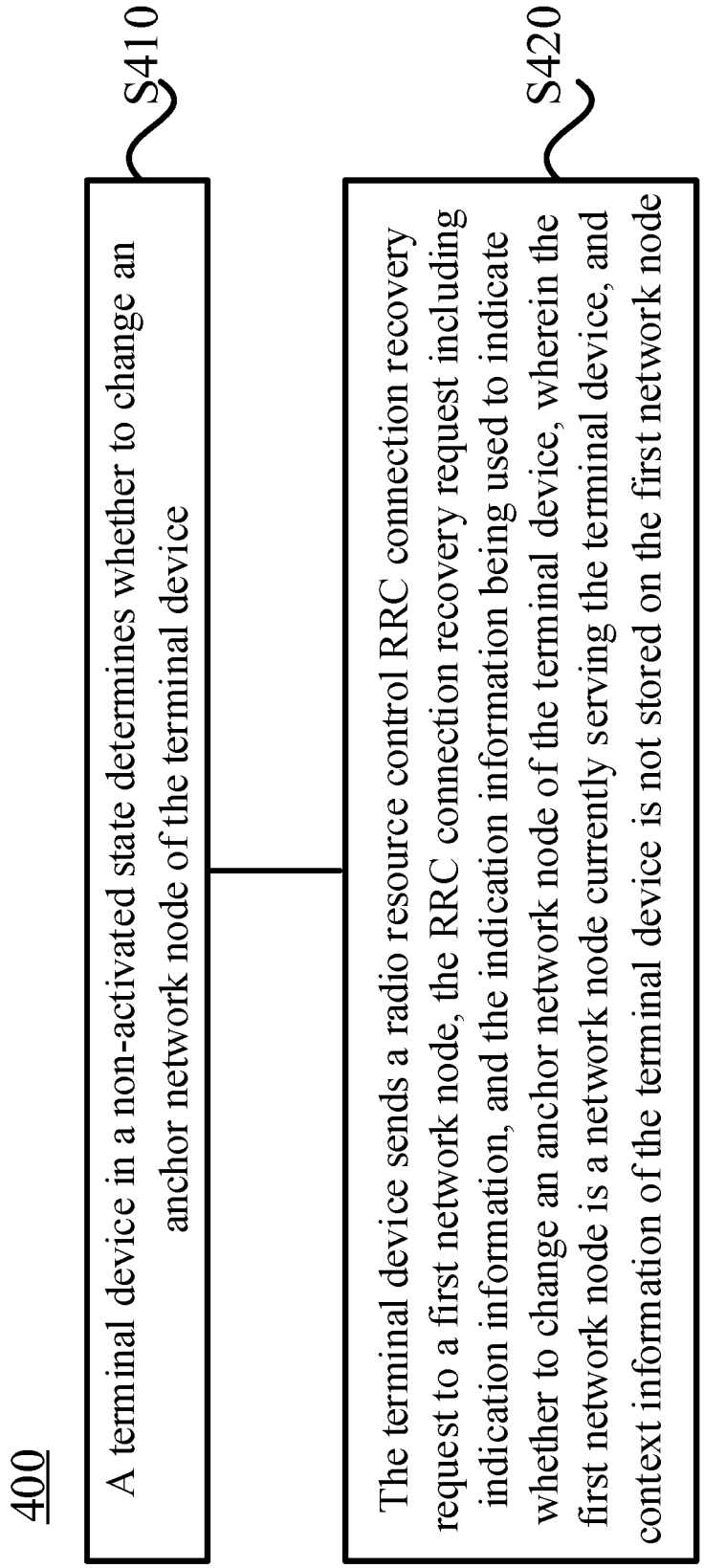
FIG. 4 is a schematic flowchart of a communication method according to still another embodiment of the present application.

FIG. 4 is a schematic flowchart of a communication method 400 according to an embodiment of the present application. The method 400 may be executed by the terminal device in the communication system 100 shown in FIG. 1. As shown in FIG. 4, the method 400 may include the following content:

in S410, the terminal device in a non-activated state determines whether to change an anchor network node of the terminal device;

in S420, the terminal device sends a radio resource control RRC connection recovery request to a first network node, and the RRC connection recovery request includes indication information, and the indication information being used to indicate whether to change the anchor network node of the terminal device, wherein the first network node is a network node currently serving the terminal device, and context information of the terminal device is not stored on the first network node.

Optionally, the terminal device may determine whether to change the anchor network node of the terminal device according to a trigger event of the RRC connection recovery request. For example, if the trigger event is an RAN location area update initiated by the terminal device itself, in this case, the terminal device can determine that it is not necessary to change the anchor network node, thereby reducing signaling overhead of the network.

Optionally, in some embodiments, the method 400 further includes:

In a case of without changing the anchor network node of the terminal device, the terminal device receives an RRC connection recovery response message sent by a second network node and forwarded by the first network node, the second network node is an anchor network node of the terminal device, and context information of the terminal device is stored on the second network node.

Optionally, in some embodiments, the method 400 further includes:

In a case of changing the anchor network node of the terminal device, the terminal device receives the RRC connection recovery response message sent by the first network node.

Optionally, in some embodiments, the S410 includes:

if the triggering event of the terminal device switching from the non-activated state to a connection state is the RAN location area update of access network, the terminal device determines not to change the anchor network node of the terminal device.

The communication method according to the embodiment of the present application is described from the perspective of a currently serving network node and a terminal device with reference to FIG. 2 to FIG. 4. The communication method according to the embodiment of the present application is described below with reference to FIG. 5 from the perspective of the anchor network node. It should be understood that the description of the anchor network node and the description of the currently serving network node and the terminal device correspond to each other. Similar descriptions can be referred to above. To avoid repetition, details are not repeated here.

Figure 5:
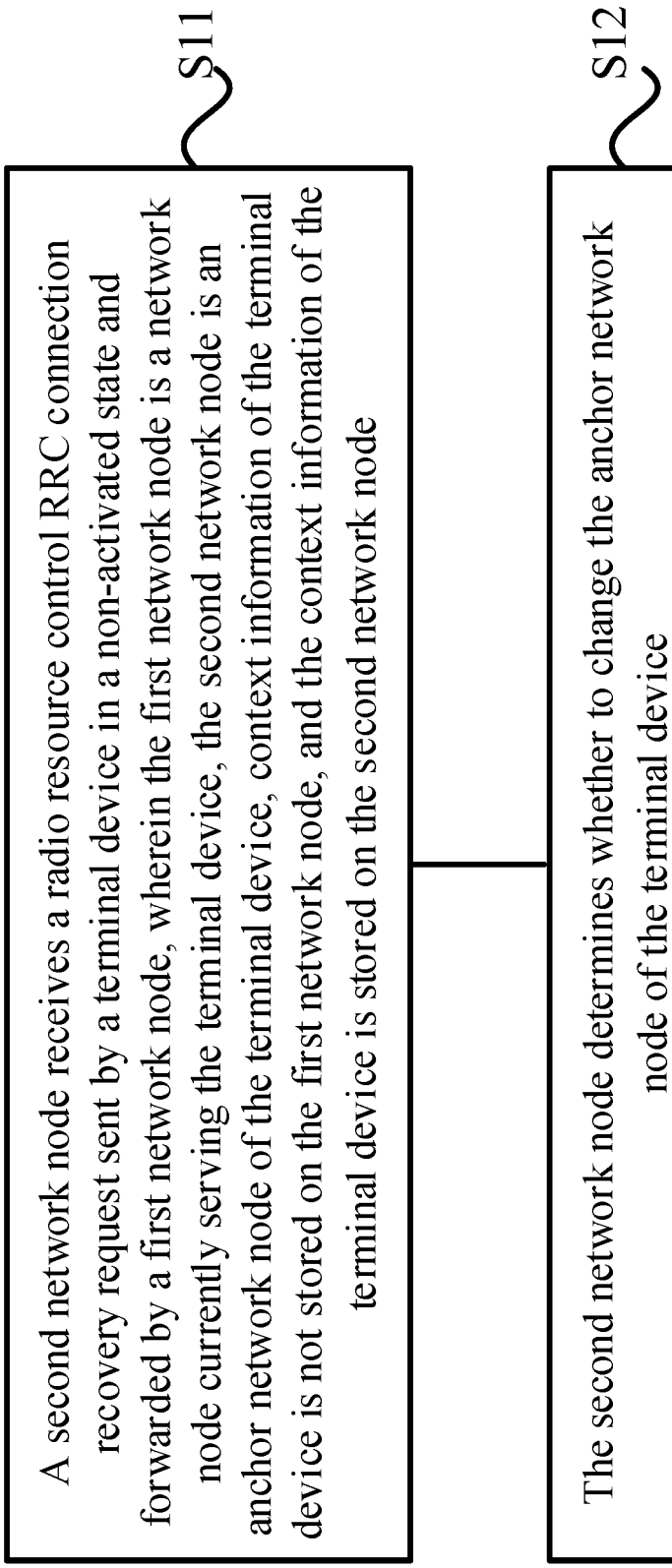
FIG. 5 is a schematic flowchart of a communication method according to still another embodiment of the present application.

FIG. 5 is a schematic interaction diagram of a communication method 10 according to an embodiment of the present application. The method 10 may be executed by the network device in the communication system 100 shown in FIG. 1. As shown in FIG. 5, the method 10 may include the following content:

in S11, a second network node receives a radio resource control RRC connection recovery request sent by a terminal device in a non-activated state and forwarded by a first network node, wherein the first network node is a network node currently serving the terminal device, the second network node is an anchor network node of the terminal device, context information of the terminal device is not stored on the first network node, and the context information of the terminal device is stored on the second network node;

in S12, the second network node determines whether to change the anchor network node of the terminal device.

Optionally, in some embodiments, the method 10 further includes:

in a case where it is determined that the anchor network node of the terminal device is not to be changed, the second network node returns an RRC connection recovery response message to the first network node, so that the first network node forwards the RRC connection recovery response message to the terminal device.

Optionally, in some embodiments, the method 10 further includes:

in a case where it is determined that the anchor network node of the terminal device is to be changed, the second network node returns the context information of the terminal device to the first network node.

The method embodiments of the present application are described in detail above with reference to FIGS. 2 to 5, and the device embodiments of the present application are described in detail below with reference to FIGS. 6 to 11. It should be understood that the device embodiments and the method embodiments correspond to each other. Similar description may refer to the method embodiments.

Figure 6:
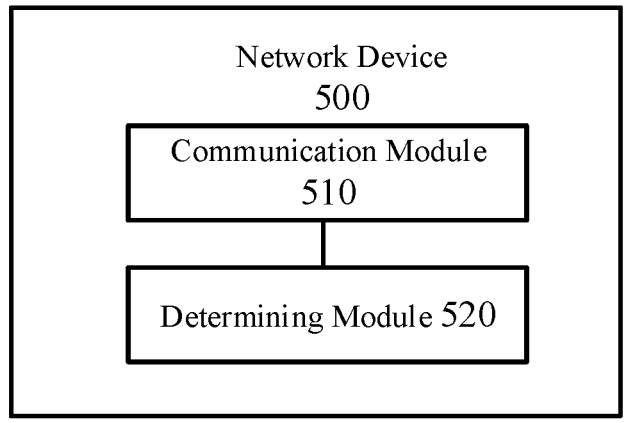
FIG. 6 is a schematic diagram of a network device according to an embodiment of the present application.

FIG. 6 shows a schematic block diagram of a network device 500 according to an embodiment of the present application. As shown in FIG. 6, the network device 500 includes:

a communication module 510, configured to receive a radio resource control RRC connection recovery request sent by a terminal device in a non-activated state, the RRC connection recovery request including indication information, and the indication information being used to indicate whether to change an anchor network node of the terminal device;

the network device is a network node currently serving the terminal device, a second network node is the anchor network node of the terminal device, context information of the terminal device is not stored on the network device, and the context information of the terminal device is stored on the second network node;

a determining module 520, configured to determine whether to change the anchor network node of the terminal device according to the indication information.

It should be understood that the network device 500 according to the embodiment of the present application may correspond to a first network node in the method embodiment of the present application, and the above and other operations and/or functions of each unit in the network device 500 are implemented for implementing corresponding process of the first network node in the method 200 shown in FIG. 2, and for the sake of brevity, it will not be repeated here.

Figure 7:
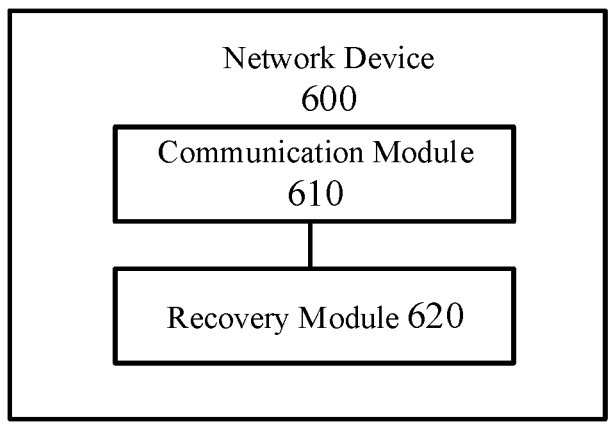
FIG. 7 is a schematic diagram of a network device according to an embodiment of the present application.

FIG. 7 is a schematic block diagram of a network device according to an embodiment of the present application. The network device 600 of FIG. 7 includes:

a communication module 610, configured to receive a radio resource control RRC connection recovery request sent by a terminal device in a non-activated state, wherein the network device is a network node currently serving the terminal device, a second network node is an anchor network node of the terminal device, context information of the terminal device is not stored on the network device, and the context information of the terminal device is stored on the second network node; and the RRC connection recovery request is forwarded to the second network node;

a recovery module 620, configured to recover RRC connection of the terminal device according to a response message of the second network node.

Specifically, the network device 600 may correspond to (for example, may be configured on or be) a first network node described in the above method 300, and each module or unit in the network device 600 is configured to execute each action or process performed by the first network node in the above method 300, respectively. Here, in order to avoid redundant description, detailed description is omitted.

Figure 8:
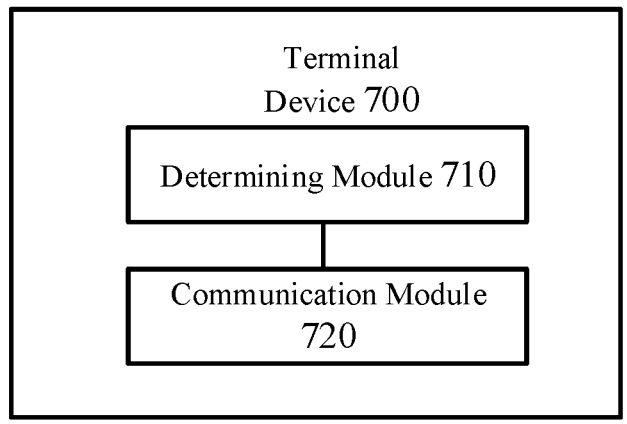
FIG. 8 is a schematic diagram of a terminal device according to an embodiment of the present application.

FIG. 8 is a schematic block diagram of a terminal device according to an embodiment of the present application. The terminal device 700 in FIG. 8 includes:

a determining module 710, configured to determine whether to change an anchor network node of the terminal device, wherein the terminal device is in a non-activated state;

a communication module 720, configured to send a radio resource control RRC connection recovery request to a first network node, the RRC connection recovery request including indication information, and the indication information being used to indicate whether to change the anchor network node of the terminal device, wherein the first network node is a network node currently serving the terminal device, and context information of the terminal device is not stored on the first network node.

Specifically, the terminal device 700 may correspond to (for example, may be configured on or be) the terminal device described in the above method 400, and each module or unit in the terminal device 700 is configured to execute each action or process performed by the terminal device in the above method 400, respectively. To avoid repetition, detailed description is omitted here.

Figure 9:
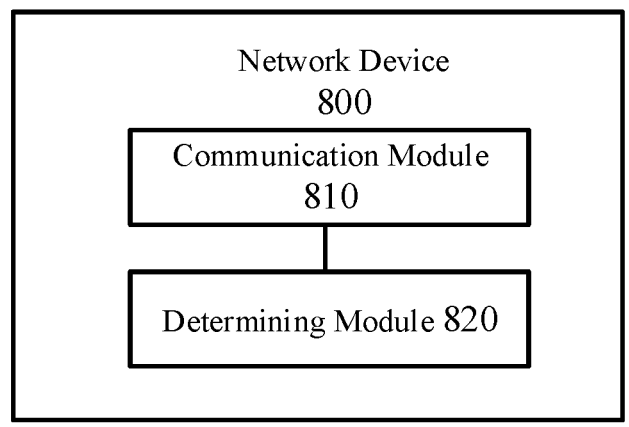
FIG. 9 is a schematic diagram of a network device according to an embodiment of the present application.

FIG. 9 is a schematic block diagram of a network device according to an embodiment of the present application. The network device 800 of FIG. 9 includes:

a communication module 810, configured to receive a radio resource control RRC connection recovery request sent by a terminal device in a non-activated state and forwarded by a first network node, wherein the first network node is a network node currently serving the terminal device, the network device is an anchor network node of the terminal device, context information of the terminal device is not stored on the first network node, and the context information of the terminal device is stored on the network device;

a determining module 820, configured to determine whether to change the anchor network node of the terminal device.

Specifically, the network device 800 may correspond to (for example, be configured on or be) a second network node described in the above method 10, and each module or unit in the network device 800 is configured to perform each action or process performed by the second network node in the above method 10 respectively. In order to avoid redundant descriptions, detailed descriptions thereof are omitted here.

Figure 10:
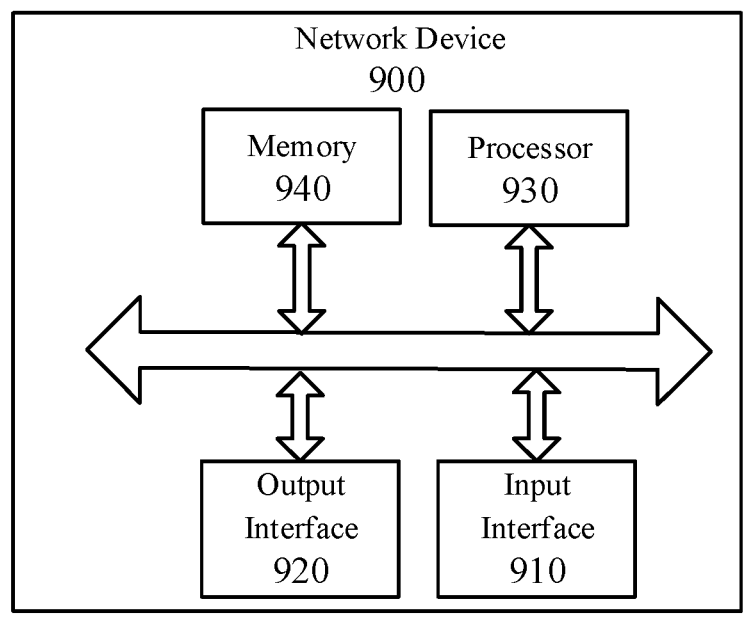
FIG. 10 is a schematic diagram of a network device according to an embodiment of the present application.

As shown in FIG. 10, the embodiment of the present application further provides a network device 900. The network device 900 may be the network device 500 in FIG. 6, or the network device 600 in FIG. 7, or the network device in FIG. 800, which can be used to execute the content of the first network node corresponding to the method 200 in FIG. 2, or the content of the first network node corresponding to the method 300 in FIG. 3, or the content of the second network node corresponding to the method 10 in FIG. 5. The network device 900 includes: an input interface 910, an output interface 920, a processor 930, and a memory 940. The input interface 910, the output interface 920, the processor 930, and the memory 940 may be connected through a bus system. The memory 940 is configured to store programs, instructions, or codes. The processor 930 is configured to execute the programs, the instructions, or the codes in the memory 940 to control the input interface 910 for receiving signals, control the output interface 920 for sending signals, and complete operations in the foregoing method embodiments.

It should be understood that, in the embodiment of the present application, the processor 930 may be a Central Processing Unit (CPU), and the processor 930 may also be other general-purpose processors or digital signal processors (DSP), application specific integrated circuits (ASIC), field programmable gate arrays (FPGA) or other programmable logic devices, discrete gates or transistor logic devices, discrete hardware components, etc. The general-purpose processor may be a microprocessor, or the processor may be any conventional processor or the like.

The memory 940 may include a read-only memory and a random access memory, and provide instructions and data to the processor 930. A part of the memory 940 may further include a non-volatile random access memory. For example, the memory 940 may also store information of device types.

In an implementation process, each content of the foregoing method may be completed by using an integrated logic circuit of hardware in the processor 930 or instructions in a form of software. The content of the method disclosed in connection with the embodiments of the present application may be directly embodied as being executed by a hardware processor, or may be executed and completed by using a combination of hardware and software modules in the processor. A software module may be located in a mature storage medium such as a random access memory, a flash memory, a read-only memory, a programmable read-only memory, or an electrically erasable programmable memory, a register, and the like. The storage medium is located in the memory 940, and the processor 930 reads the information in the memory 940 and completes the content of the foregoing method in combination with its hardware. To avoid repetition, it will not be described in detail here.

In a specific implementation manner, the communication module 510 included in the network device 500 in FIG. 6 may be implemented by using the output interface 920 and the input interface 910 in FIG. 10, and the determining module 520 included in the network device 500 in FIG. 6 may be implemented by using the processor 930 in FIG. 10.

In a specific implementation manner, the communication module 610 included in the network device 600 in FIG. 7 may be implemented by using the output interface 920 and the input interface 910 in FIG. 10, and the recovery module 620 included in the network device 600 in FIG. 7 may be implemented by using the processor 930 in FIG. 10.

In a specific implementation manner, the communication module 810 included in the network device 800 in FIG. 9 may be implemented by using the output interface 920 and the input interface 910 of FIG. 10, and the recovery module 820 included in the network device 600 in FIG. 7 may be implemented by using the processor 930 in FIG. 10.

Figure 11:
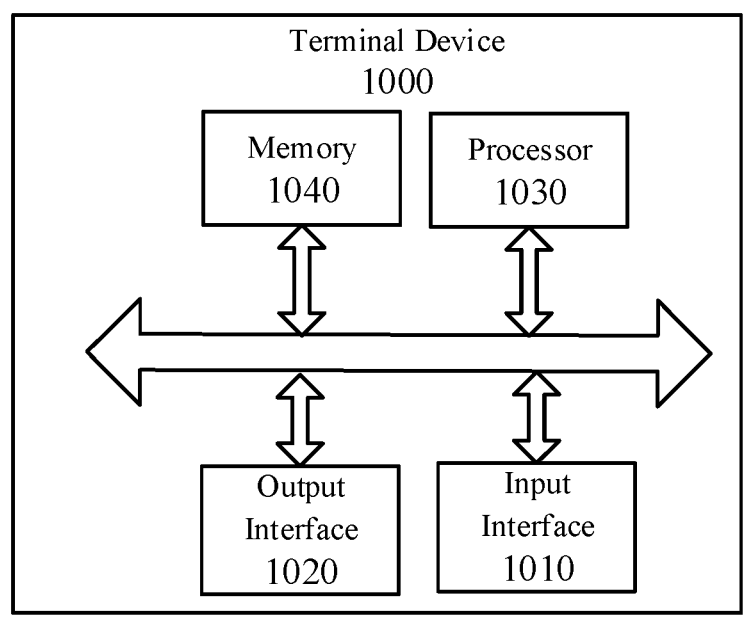
FIG. 11 is a schematic diagram of a terminal device according to an embodiment of the present application.

As shown in FIG. 11, a terminal device 1000 is further provided by an embodiment of the present application. The terminal device 1000 may be the terminal device 700 in FIG. 8, which can be used to execute the content of the terminal device corresponding to the method 400 in FIG. 4. The device 1000 includes: an input interface 1010, an output interface 1020, a processor 1030, and a memory 1040. The input interface 1010, the output interface 1020, the processor 1030, and the memory 1040 may be connected through a bus system. The memory 1040 is configured to store programs, instructions, or codes. The processor 1030 is configured to execute the programs, the instructions, or the codes in the memory 1040 to control the input interface 1010 for receiving signals, control the output interface 1020 for sending signals, and complete operations in the foregoing method embodiments.

It should be understood that, in the embodiment of the present application, the processor 1030 may be a Central Processing Unit (CPU), and the processor 1030 may also be other general-purpose processors or digital signal processors (DSP), application specific integrated circuits (ASIC), field programmable gate arrays (FPGA) or other programmable logic devices, discrete gates or transistor logic devices, discrete hardware components, etc. The general-purpose processor may be a microprocessor, or the processor may be any conventional processor or the like.

The memory 1040 may include a read-only memory and a random access memory, and provide instructions and data to the processor 1030. A part of the memory 1040 may further include a non-volatile random access memory. For example, the memory 1040 may also store information of device types.

In an implementation process, each content of the above method may be completed through an integrated logic circuit of hardware in the processor 1030 or instructions in the form of software. The content of the method disclosed in connection with the embodiments of the present application may be directly embodied as being executed by a hardware processor, or may be executed and completed by using a combination of hardware and software modules in the processor. A software module may be located in a mature storage medium such as a random access memory, a flash memory, a read-only memory, a programmable read-only memory, or an electrically erasable programmable memory, a register, and the like. The storage medium is located in the memory 1040, and the processor 1030 reads the information in the memory 1040 and completes the content of the above method in combination with its hardware. To avoid repetition, it will not be described in detail here.

In a specific implementation manner, the determining module 710 included in the terminal device 700 in FIG. 8 may be implemented by using the processor 1030 in FIG. 11, and the communication module 720 included in the terminal device 700 in FIG. 8 may be implemented by using the output interface 1020 and the input interface 1010 in FIG. 11.

In an embodiment of the present application, there is further provided a computer-readable storage medium, wherein the computer-readable storage medium stores one or more programs, the one or more programs include instructions, and when the instructions are executed by a portable electronic device including a plurality of application programs, cause the portable electronic device to execute the methods in the embodiments shown in FIG. 2 to FIG. 5.

In an embodiment of the present application, there is further provided a computer program, the computer program including instructions, which when the computer program is executed by a computer, enable the computer to execute a corresponding process of the method shown in FIG. 2 to FIG. 5.

Those of ordinary skill in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A professional technician can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods can be implemented in other ways. For example, the device embodiments described above are only schematic. For example, the division of the unit is only a logical function division. In actual implementation, there may be another division manner. For example, multiple units or components may be combined or may be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present application may be integrated into one processing unit, or each of the units may exist separately physically, or two or more units may be integrated into one unit.

When the functions are implemented in the form of software functional units and sold or used as independent products, they can be stored in a computer-readable storage medium. Based on such an understanding, the technical solution of the present application is essentially a part that contributes to the existing technology or a part of the technical solution may be embodied in the form of a software product, wherein the computer software product storing in a storage medium includes a number of instructions to enable a computer device (which may be a personal computer, a server, or a network device, etc.) to perform all or part of the steps of the method described in the embodiments of the present application. The foregoing storage media include: U disks, mobile hard disks, read-only memory (ROM, Read-Only Memory), random access memory (RAM, Random Access Memory), magnetic disks, or optical disks and other media that can store program codes.

The above is only a specific implementation of this application, but the scope of protection of this application is not limited to this. Any of those skilled in the art can easily think of changes or replacements within the technical scope disclosed in this application. It should be covered by the protection scope of this application. Therefore, the protection scope of this application shall be subject to the protection scope of the claims.

What is claimed is:

1. A communication method, comprising:
    receiving, by a first network node, a radio resource control (RRC) connection recovery request sent by a terminal device in a non-activated state, wherein the first network node is a network node currently serving the terminal device, a second network node is an anchor network node of the terminal device, context information of the terminal device is not stored on the first network node, and the context information of the terminal device is stored on the second network node, and the RRC connection recovery request comprises indication information for indicating whether to change an anchor network node of the terminal device;
    forwarding, by the first network node, the RRC connection recovery request to the second network node;
    receiving, by the first network node, the context information of the terminal device sent by the second network node, in a case where the indication information indicates that the anchor network node of the terminal device is to be changed; and
    recovering, by the first network node, RRC connection of the terminal device, according to the context information from the second network node.

2. The method according to claim 1, wherein, the anchor network node of the terminal device is a network node that was last connected to before the terminal device enters the non-activated state.

3. A communication method, comprising:
    receiving, by a second network node, a radio resource control (RRC) connection recovery request sent by a terminal device in a non-activated state and forwarded by a first network node, wherein the first network node is a network node currently serving the terminal device, the second network node is an anchor network node of the terminal device, context information of the terminal device is not stored on the first network node, and the context information of the terminal device is stored on the second network node, and the RRC connection recovery request comprises indication information for indicating whether to change an anchor network node of the terminal device;
    determining, by the second network node, whether to change the anchor network node of the terminal device; and
    providing, by the second network node, the context information of the terminal device to the first network node, in a case where the indication information indicates that the anchor network node of the terminal device is to be changed.

4. The method according to claim 3, wherein, the anchor network node of the terminal device is a network node that was last connected to before the terminal device enters the non-activated state.

5. A network device, comprising memory, a processor, an input interface, and an output interface, wherein, the memory, the processor, the input interface and the output interface are connected through a bus system, the memory is used to store instructions, and the processor is configured to execute the instructions stored in the memory, to cause the network device to perform the method according to claim 1.

6. The network device according to claim 5, wherein, the anchor network node of the terminal device is a network node that was last connected to before the terminal device enters the non-activated state.

7. A terminal device, comprising memory, a processor, an input interface, and an output interface, wherein, the memory, the processor, the input interface and the output interface are connected through a bus system, the memory is used to store instructions, and the processor is configured to execute the instructions stored in the memory, to cause the terminal device to:
    determine whether to change an anchor network node of the terminal device, wherein the terminal device is in a non-activated state; and
    send a radio resource control (RRC) connection recovery request to a first network node, the RRC connection recovery request including indication information for indicating whether to change the anchor network node of the terminal device, wherein the first network node is a network node currently serving the terminal device, and context information of the terminal device is not stored on the first network node.

8. The terminal device according to claim 7, wherein, the terminal device is further caused to:
    receive an RRC connection recovery response message sent by a second network node and forwarded by the first network node, in a case where the anchor network node of the terminal device is not to be changed, wherein the second network node is the anchor network of the terminal device node, and the context information of the terminal device is stored on the second network node.

9. The terminal device according to claim 7, wherein, the terminal device is further caused to:
if a trigger event of the terminal device switching from the non-activated state to a connection state is RAN location area update of access network, determine not to change the anchor network node of the terminal device.

10. The terminal device according to claim 7, wherein, the anchor network node of the terminal device is a network device that was last connected to before the terminal device enters the non-activated state.

11. A network device, comprising memory, a processor, an input interface, and an output interface, wherein, the memory, the processor, the input interface and the output interface are connected through a bus system, the memory is used to store instructions, and the processor is configured to execute the instructions stored in the memory, to cause the network device to perform the method according to claim 3.

12. The network device according to claim 11, wherein, the anchor network node of the terminal device is a network node that was last connected to before the terminal device enters the non-activated state.

* * * * *